United States Patent Office.

EDMUND McILHENNY, OF NEW IBERIA, LOUISIANA.

Letters Patent No. 107,701, dated September 27, 1870.

IMPROVEMENT IN PEPPER-SAUCE.

The Schedule referred to in these Letters Patent and making part of the same.

To all whom it may concern:

Be it known that I, EDMUND McILHENNY, of New Iberia, in the parish of Iberia and State of Louisiana, have invented a new and improved Pepper-Sauce; and I do hereby declare that the following is a full, clear, and exact description thereof, which will enable others skilled in the art to make and use the same.

This invention relates to a new process of preparing an aromatic and strong sauce from the pepper known in the market as Tabasco pepper. This pepper is as strong as Cayenne pepper, but of finer flavor.

My method of preparing the sauce is as follows:

The ripe fruit is mashed to pulp and mixed with fine vinegar and rock salt, in the proportions of one pint of vinegar and one handful of salt to every gallon of pulp.

The receptacle containing this mixture is closely covered, and the latter macerated for about six weeks, when the pulp is worked through a sieve that is just fine enough to not permit the seeds to pass. About one drop of bisulphate of lime is then added to every ounce of mixture, for preventing fermentation.

The skins and suds not passed through the sieve are potted for about twenty-four hours, with an ounce of alcohol to each pound of the residue.

This mixture is thoroughly agitated and then placed under a press, by which the remaining pulp and juice are forced out.

A drop of bisulphate of lime is added to every ounce received from the press. The two mixtures thus prepared are now put together, and the whole compound worked through a fine flour sieve. The sauce is thus completely prepared and ready for use.

One or two drops of it will be sufficient for any dish.

Having thus described my invention,

I claim as new and desire to secure by Letters Patent—

1. The pepper-sauce prepared of the ingredients herein set forth, substantially in the manner specified.

2. The herein-described process of preparing pepper-sauce from the ingredients, in about the proportions set forth.

E. McILHENNY.

Witnesses:
DUDLEY AVERY,
L. G. BLANCHET.